United States Patent

Fukasawa

Patent Number: 5,945,484
Date of Patent: Aug. 31, 1999

[54] WATER-IN-OIL TYPE DISPERSE INK

[75] Inventor: Teruaki Fukasawa, Isezaki, Japan

[73] Assignee: Kabushiki Kaisha Pilot, Tokyo, Japan

[21] Appl. No.: 08/979,933

[22] Filed: Nov. 26, 1997

[30] Foreign Application Priority Data

Nov. 28, 1996 [JP] Japan ................................ 8-353401

[51] Int. Cl.⁶ .......................... C09D 11/00; C09D 11/02; C09D 11/16; C08F 120/02; C08F 120/06; C08K 5/07; C08K 5/13; C08K 5/17

[52] U.S. Cl. ........................ 525/132; 525/153; 525/183; 525/185; 524/272; 106/31.26; 106/31.57; 106/31.27

[58] Field of Search ................................ 525/132, 153, 525/183, 185; 524/272; 106/31.25, 31.26, 31.27, 31.57

[56] References Cited

U.S. PATENT DOCUMENTS

| | | |
|---|---|---|
| 2,623,827 | 12/1952 | Moos . |
| 3,246,997 | 4/1966 | Sumner et al. ................ 106/31.26 |
| 4,671,691 | 6/1987 | Case et al. ..................... 401/142 |
| 4,726,845 | 2/1988 | Thompson et al. ............ 106/25 |
| 5,010,125 | 4/1991 | Kruse et al. ................... 524/308 |
| 5,314,531 | 5/1994 | Huber et al. .................. 106/31.37 |
| 5,342,440 | 8/1994 | Wickramanayake ........... 106/31.43 |
| 5,395,435 | 3/1995 | Mizobuchi ..................... 106/31.26 |
| 5,573,578 | 11/1996 | Okuda ........................... 106/31.26 |
| 5,622,548 | 4/1997 | Zou et al. ...................... 106/31.26 |
| 5,718,747 | 2/1998 | Okusawa ....................... 106/31.26 |
| 5,741,354 | 4/1998 | Kawasumi et al. ............ 106/31.85 |
| 5,772,741 | 6/1998 | Spinelli ......................... 106/31.25 |
| 5,800,599 | 9/1998 | Asada ........................... 106/31.26 |

FOREIGN PATENT DOCUMENTS

| | | |
|---|---|---|
| 0717090A1 | 3/1994 | European Pat. Off. . |
| WO 95/10571 | 4/1995 | European Pat. Off. . |
| 0587291A2 | 6/1996 | European Pat. Off. . |
| 64-8673 | 2/1989 | Japan . |
| 6-31314 | 2/1994 | Japan . |
| 6-256700 | 9/1994 | Japan . |
| 7-196972 | 8/1995 | Japan . |

*Primary Examiner*—Vasu Jagannathan
*Assistant Examiner*—Callie E. Shosho
*Attorney, Agent, or Firm*—Foley & Lardner

[57] ABSTRACT

A water-in-oil dispersed ink comprising:

(A) a water-insoluble dispersion medium comprising 20% by weight—50% by weight of a water-insoluble polar solvent of an aromatic alcohol and/or an aliphatic glycol phenyl ether, 0.5% by weight—5.0% by weight of a water-insoluble organic amine, and 3% by weight—30% by weight of an oil-soluble dye, all percentages being based on the total weight of the ink; and (B) a particulate dispersion phase including a dispersion stabilizing phase comprising a polyhydric alcohol that is formed on the surface of dispersed particles, the particulate dispersion phase comprising 20% by weight—50% by weight of the polyhydric alcohol, and a water-based dispersoid comprising 3% by weight—20% by weight of water, 0.3% by weight—2.0% by weight of a cross-linking acrylic acid polymer, and 0.5% by weight—4.0% by weight of triethanol amine, all percentages being based on the total weight of the ink, and wherein the dispersed particles are uniformly dispersed in the dispersion medium.

17 Claims, No Drawings

WATER-IN-OIL TYPE DISPERSE INK

BACKGROUND OF THE INVENTION

1. Field of the Invention

The present invention relates to a water-in-oil type dispersed ink capable of use in a ball-point pen. More specifically, the invention relates to a water-in-oil type dispersed ink for use as a direct filling ink in a ball-point pen.

2. Description of Related Art

Since conventional water-based ball-point pens suffer drawbacks such as leakage, sagging, etc. of ink in spite of an excellent writing property as stated, for example, in JP-A-07-173,426, U.S. Pat. No. 4,671,691, EP 870,204, JP-B-64-8,673, JP-A-06-256,700, etc., these patent publications have disclosed techniques for improving such defective pens. For example, these documents describe techniques wherein the writing sensation and writing itself are similar to that found with conventional water-based ball-point pens such as imparting a shear thinning property to the ink, increasing the viscosity of the interior of the ink tank to a relatively high level, and/or utilizing the rotation of the ball to lower the viscosity of ink during the course of writing.

None of these techniques, however, sets the viscosity of the ink in the ink tank at a level that is high enough to sufficiently prevent the ink from leaking through or sagging down from the tip of the pen when the pen is exposed to a shock, nor do any of those techniques confer a perfect writing quality upon the pen. After all, since conventional techniques employ water as a main solvent and possesses other limitations affecting the supply of the ink to the tip of the pen and/or the permeation of the ink through the surface of the paper, the use of such water-based solvent's generally does not increase the viscosity of the ink as desired. Thus, the water-based ball-point pen ink generally sags down, offers only a limited resistance to a shock and produces a writing of insufficient fastness.

Further, since these techniques use water, they generally have a further technical problem; namely, since they generally include a water-soluble dye as a coloring material so as to improve the stability of the ink and to withstand the effect of aging, the fastness of writing quality is adversely affected. On the other hand, the use of a pigment improves the fastness of the writing while sacrificing of the ability of the ink to withstand the effect of aging.

In contrast, an oil-based ball-point pen manifests a sufficiently high ink-retaining property, but nevertheless generally does not permit smooth writing under a low writing pressure because the viscosity of the ink is typically very high. Thus with respect to oil-based inks, the density of the writing is generally insufficient owing to a poor supply of ink.

In recent years, JP-A-63-114,695, JP-A-06-31,314, and JP-A-07-196,972 have disclosed what is called "oil-based gel ink." None of these patents relating to gel inks incorporate water in their formulations. The oil gel inks described in these patents are disadvantageous since they fail to prevent the permeation of writing through the paper to the rear side when the viscosity of the oil gel ink is set at a low level, i.e., in the range of 300–3000 mPaS, which is a range that generally allows for ease in writing.

SUMMARY OF THE INVENTION

The present invention therefore aims to provide an ink which substantially solves drawbacks of the water-based and oil-based ball-point pen inks.

In accordance with these and other objectives, there is provided a water-in-oil type disperse ink comprising: (A) a water-insoluble dispersion medium comprising 20% by weight—50% by weight of a water-insoluble polar solvent of an aromatic alcohol and/or an aliphatic glycol phenyl ether, 0.5% by weight—5.0% by weight of a water-insoluble organic amine, and 3% by weight—30% by weight of an oil-soluble dye, based on the total weight of the ink; and (B) a particulate dispersion phase having a dispersion stabilizing phase of a polyhydric alcohol that is formed on the surface of dispersed particles, and comprises 20% by weight—50% by weight of the polyhydric alcohol, and a water-based dispersoid comprising 3% by weight—20% by weight of water, 0.3% by weight—2.0% by weight of a cross-linking acrylic acid polymer, and 0.5% by weight—4.0% by weight of triethanol amine, based on the total weight of the ink composition, and wherein the dispersed particles are uniformly dispersed in the dispersion medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF PREFERRED EMBODIMENTS

As used herein, unless stated otherwise, all weight percentages are based on the total weight of the ink.

This invention preferably includes a water-in-oil type dispersed ink which includes a water-based dispersion phase capable of imparting a shear thinning property and that is uniformly dispersed in a water-insoluble dispersion medium containing a coloring material. The present invention thus preferably provides an ink which excels in resistance to shock, fastness of writing trace, and stability to withstand the effect of aging.

The water-insoluble dispersion medium preferably includes a water-insoluble polar solvent formed of an aromatic alcohol and/or an aliphatic glycol ether.

The use of the water-insoluble polar solvent as a main solvent is not only effective in preventing the ink from vaporizing, but is also highly effective in enhancing both the fastness of the ink at the tip of the pen and the lubricity of the ink during the rotation of the ball. For the purpose of further enhancing the lubricity, oil-based lubricants including fatty acids are available for free selection and can be included if desired. Suitable oil-based lubricants are generally not water soluble and such a lubricant will act to decrease friction when the writing tip of a pen is rotated. In particular, an oil-based lubricant will lubricate the tip ball to help it rotate smoothly, thereby reducing friction between the ball and a ball holder of the pend so as to improve writing capability or feeling. Any oil-based lubricant is suitable in the present invention.

If the amount of the water-insoluble polar solvent to be incorporated is less than about 20% by weight, the dispersion medium will generally not easily be converted into a stable homogeneous system and the solvent will generally not be as highly effective as expected. If the amount of polar solvent exceeds about 50% by weight, the oil-phase part and the water-phase part will tend to readily separate and will generally not form a homogeneous ink. Thus, the amount is preferred to be in the range of 20% by weight–50% by weight based on the total weight of the ink.

Concrete examples of suitably water-insoluble polar solvents include aromatic alcohols and/or aliphatic glycol phenyl ethers. Suitable examples of the aromatic alcohol include one or more of benzyl alcohol, phenyl ethyl alcohol, methyl phenyl carbinol, and phthalyl alcohols. As concrete examples of the aliphatic glycol phenyl ether, ethylene glycol monophenyl ether, propylene glycol phenyl ether, and/or propylene glycol diphenyl ether may be cited.

The water-insoluble dispersion medium preferably contains a water-insoluble organic amine neutralizing agent.

In the water-insoluble dispersion medium is generally dispersed the dispersion phase which is preferably formed of particles having a cross-linking acrylic acid polymer as a main component thereof. Any cross-linking acrylic acid polymer is suitable for use in the present invention. For the purpose of stably dispersing the dispersion phase, the cross-linking acrylic acid polymer should preferably manifest affinity for the dispersion medium. It is preferable that the ink of the present invention be neutralized with the water-insoluble organic amine in order to keep the composition homogeneous.

In short, a water-insoluble organic amine is preferably included as a neutralizing agent because the dispersion medium is in the form of a water-insoluble polar solvent and the dispersion phase is in the form of particles including a cross-linking acrylic acid polymer dispersed in water. Therefore, the cross-linking acrylic acid polymer should preferably also manifest affinity for the water-insoluble dispersion medium. For the purpose of stabilizing the particles of the water-based dispersion phase, the dispersion phase should preferably include a hydrophilic triethanol amine. Thus, the present ink preferably employs two kinds of amines, one in the dispersion medium, and one in the dispersion phase.

The water-insoluble organic amines which are effectively used herein include, for example, one or more of polyoxyethylene alkyl amines, cetyl amine, and oleyl amine. The amount of the water-insoluble organic amine to be incorporated herein is generally in the range of 0.5% by weight–5.0% by weight based on the total weight of the ink.

As the coloring material, an oil-soluble dye may be added to the dispersion medium. The ink may be deficient in the fastness of the written ink in spite of perfect stability if a water-soluble dye is used as the coloring material instead of an oil-soluble dye. Further, the ink may be deficient in stability in spite of perfect fastness of writing if a pigment is used as the coloring material. In contrast, the use of an oil-soluble dye as the coloring material has an advantage of improving the ink not only in stability but also in fastness of the written ink. The amount of the oil-soluble dye to be incorporated is preferred to be in the range of 3% by weight–30% by weight based on the total weight of the ink because writing with the ink will typically have insufficient darkness if the amount is less than about 3% by weight and because the ink may be deficient in its resistance to dry-up or in stability if the amount exceeds about 30% by weight. An oil-soluble dye can be used without posing any particular restriction. As concrete examples of the oil-soluble dye, SPILON Black GMH, SPILON Blue C-HR, and SPILON Violet C-RH (produced by Hodogaya Chemical Industry Co., Ltd.) and VALIFAST Red 1320, VALIFAST Blue 1621, and/or VALIFAST Red 1701 (produced by Orient Chemical Co., Ltd.) may be cited.

It is also possible to additionally use a water-soluble dye capable of generating a clear color as a complementary color since the present ink contains a water component. That is, the particles may have incorporated therein a water-soluble dye as a further colorant. The amount of the water-soluble dye to be incorporated is preferred to be in the range of 0.5% by weight–5.0% by weight based on the total weight of the ink for the same reason as the oil-based dye. The water-soluble dye can be also used without posing any particular restriction. As concrete examples of the water-soluble dye, Direct Black 19, Direct Black 154, Direct Blue 3, Acid Blue 90, Acid Red 94, Acid Red 92, and/or Acid Orange 56 may be cited.

As the dispersion phase, the cross-linking acrylic acid polymer is used typically as a main component. The cross-linking acrylic acid polymer is used inter alia, for the purpose of imparting a shear thinning property to the ink.

The writing generated during the course of a writing operation tends to depend heavily on the rotation of the ball at the tip of the pen. The viscosity of the ink, let alone the resistance which occurs during the rotation of the ball between the holder material and the surface of the ball seat, heavily affects the writing sensation. In short, when the viscosity of the ink is very high, resistance is generated due to the rotation of the ball and thereby impairs the writing sensation. Generally an oil-based ball-point pen ink is felt to produce a very heavy writing sensation mainly because the viscosity of these inks tend to be very high. The present invention, therefore, contemplates imparting a shear thinning property to the ink, thereby lowering the viscosity of the ink so that rotation of the ball during the course of writing, is positively attached, and thus decreasing the resistance to the rotation of the ball to the fullest extent possible. The present ink additionally improves the writing sensation, inter alia, by the use of a cross-linking acrylic acid polymer.

This invention further enables the viscosity of the ink inside the ink tank, which is not subject to shear strength, to be set at a relatively high level sufficient to substantially prevent the leakage of ink. The cross-linking acrylic acid polymer is preferably used as a shear thinning polymer, first because this polymer exhibits substantially no film-forming property while in a dry state. That is, ink containing a cross-linked acrylic acid polymer dries and solidifies weakly at the tip of the pen and thus does not generally impair the ability of the ink to flow out smoothly from the tip of the pen. Secondly, the ink will also tend to have a very high yield value and the leakage of ink can be prevented even at a relatively low viscosities.

To obtain a perfect writing sensation, the viscosity of the ink during the course of writing should preferably be set at a level in the range of 300 Mpas–3000 Mpas. By setting the viscosity in this range, it is made possible to attain a soft writing sensation that cannot be obtained with a water-based ball-point pen ink and a light writing sensation that cannot be obtained with the oil-based ball-point pen ink.

If the amount of the cross-linking acrylic acid polymer to be incorporated is less than about 0.3% by weight, it will be difficult to prevent leakage and the viscosity of the ink will not be sufficient to improve the writing sensation or to prevent the permeation of the writing through the paper to the rear side thereof. If this amount exceeds about 2.0% by weight, the polymer may not be sufficiently swelled and dispersed in the ink and may not allow formation of a homogeneous ink. Thus, this amount is preferred to be in the range of 0.3% by weight–2.0% by weight.

The cross-linking acrylic acid polymer is preferably neutralized and stabilized by a triethanol amine in the dispersion phase, whereas the dispersion phase is preferably neutralized by a water-insoluble organic amine incorporated in the dispersion medium. Thus, the cross-linking acrylic acid polymer bears closely on both the dispersion phase and the dispersion medium and acts to stabilize dispersion of the dispersoid in the ink, stabilize the physical properties of the ink as an integral substance, and confers a substantially perfect shear thinning property on the ink. Though the amount of the cross-linking acrylic acid polymer to be incorporated can be varied, it is preferred to be in the range of about 0.5% by weight–about 4.0% by weight.

As the neutralizing agent for the cross-linking acrylic acid polymer incorporated in the dispersion phase, triethanol amine proves to be most appropriate, although any suitable neutralizing agent may be employed.

The dispersion phase which comprises dispersed particles may be produced by adding the cross-linking acrylic acid polymer, the triethanol amine, and the polyhydric alcohol to water. The water is used because it tends to be most advantageous for the purpose of swelling the cross-linking acrylic acid polymer and because it is generally effective in preventing the permeation of the writing through the paper to the rear side thereof. In order to obtain a smooth writing sensation under a low writing pressure, the viscosity of the ink during the course of writing is preferably set at a level in the range of 300 Mpas–3000 Mpas. This range may be compared with the range of 10000 Mpas–20000 Mpas that is typically adopted by conventional inks for the oil-based ball-point pens. The viscosity of the ink at the level used in conventional oil-based inks may often result in permeation of the writing through the paper to the rear side thereof to occur when a water-insoluble polymer solvent is used as a main solvent. The ink of the present invention almost never incurs such a permeation of the writing because the dispersion phase contains water. Though the mechanism by which the water prevents the permeation of the writing through the paper remains yet to be elucidated, this prevention may be logically explained by a supposition that the barrier property inherent in the water component and the reaction of the water component with the surface of the paper substantially prevent the oil component from permeating the paper. The permeation of the writing through the paper to the rear side thereof will generally not be sufficiently prevented if the amount of water to be incorporated is less than about 3% by weight and a homogeneous ink will be difficult to obtain if the amount exceeds about 20% by weight. The amount of water derived from the dispersion phase, therefore, is preferred to be in the range of 3% by weight–20% by weight.

Further, for the purpose of allowing the solvent to form a homogeneous system, the use of a polyhydric alcohol is highly desirable.

The effect and usefulness of the water-insoluble polar solvent and the water have been described above. When only these two components are used by themselves, a stable and homogeneous ink is difficult to obtain, fundamentally because the water-insoluble polar solvent dissolves water only in a very small amount. The stable and uniform ink, therefore, is preferably obtained by incorporating a polyhydric alcohol, a substance manifesting affinity for both the components under discussion, as a dispersion-stabilizing agent for water in the water-insoluble polar solvent, thereby forming a layer of the polyhydric alcohol on the surface of the particles of the dispersion phase and improving the stability of dispersion of the particles of the dispersion phase. The polyhydric alcohol will generally manifest an insufficient effect as the dispersion-stabilizing agent if the amount thereof to be incorporated is less than about 20% by weight. A homogeneous ink will be obtained only with difficulty and the water-insoluble polar solvent will tend to manifest an insufficient effect if the amount exceeds about 50% by weight. Thus, the amount is preferred to be in the range of 20% by weight–50% by weight. For the dispersion-stabilizing agent, one or more polyhydric alcohols selected from among ethylene glycol, propylene glycol, glycerin, diethylene glycol, thiodiglycol, polyglycerin, polyethylene glycol, methyl cellosolve, butyl cellosolve, methyl carbitol, and ethyl carbitol may be used.

The particles of the dispersion phase are preferred to be minute particles having diameters in the range of 100–1000 Å.

Since the particles of the dispersion phase contain water, the dispersion phase may incorporate therein a water-soluble or water-based dye as a complementary color. A water-based dye generally constitutes an effective complementary color because it generally emits a clear color. From the viewpoint of the resistance to the phenomenon of dry-up, the amount of this optional dye to be incorporated, if employed, is preferred to be in the range of about 0.5% by weight–about 5.0% by weight. The water-soluble dye can likewise be used without posing any particular restriction. Concrete examples of the water-soluble dye include one or more of Direct Black 19, Direct Black 154, Direct Blue 3, Acid Blue 90, Acid Red 94, Acid Red 92, and Acid Orange 56.

The amount of the optional oil-based lubricant, if incorporated, is preferred to be in the range of about 0.5% by weight–about 5.0% by weight. The effect of the lubricity manifested during the rotation of the ball will be less effective if the amount is less than about 0.5% by weight, and the ink may be deficient in the stability to withstand the effect of aging if the amount exceeds about 5.0% by weight. As concrete examples of the oil-based lubricant to be effectively used herein, lauric acid, oleic acid, ricinolic acid, stearic acid, and/or soybean fatty acid may be cited.

The ink using the cross-linking acrylic acid polymer generally possesses a very high yield value. If the viscosity of the ink is set solely with the cross-linking acrylic acid polymer, the ink at times may be deficient in flowability and may not be quickly supplied for the sake of writing. An optional thickener which permits the ink to maintain its flowability and enables the viscosity of the ink during the course of writing to be set arbitrarily at an expected level may expediently be additionally incorporated. This thickener is generally not preferred to specifically impart a shear thinning property to the ink. Any thickener may be used in the present invention and the thickener generally comprises a water-insoluble viscosity increasing agent. The amount of the optional thickener, if incorporated, is preferred to be in the range of 1% by weight–15% by weight because the effect of the thickener may be less marked if the amount is less than about 1% by weight and because the cross-linking acrylic acid polymer may be prevented from being homogeneously and stably swelled and dispersed if the amount exceeds about 15% by weight. As concrete examples of the thickener of this description, ketone resin, phenol resin, amide resin, xylene resin, and/or hydrated rosin resin may be cited.

An optional rustproof agent may be incorporated, particularly since the ink contains a water component and the material for the tip of the pen may be a metal. It may be advantageous herein to use a rustproof lubricant which is additionally vested with the role of a lubricant, i.e., a component that is both a rustproof agent and a lubricant, for improving the rotation of the ball at the tip of the pen. The amount of the rustproof lubricant, if incorporated, is preferred to be in the range of 0.2% by weight–3.0% by weight because the rustproof and lubricant effect may have reduced effect if the amount is less than about 0.2% by weight and because the cross-linking acrylic acid polymer may be prevented from swelling if the amount exceeds about 3.0% by weight. The optional rustproof lubricant should preferably be soluble in water. One or more rustproof lubricants selected from among phosphoric ester-based surfactants, benzotriazole, and/or fatty acid esters may be used.

Since the ink contains a water component, it may be preferable to incorporate a fungusproof agent for the purpose of preventing the stability of the ink from being deteriorated by the growth of bacteria or other germs. The optional fungusproof agent should preferably be soluble in water. As concrete examples of the fungusproof agent, 1,2-benzoisothiazolin-3-on, sodium benzoate, and/or sodium dehydroacetate may be cited. The amount of the fungusproof agent, if incorporated, is preferred to be in the range of 0.2% by weight–1.0% by weight because the fungusproof effect may be insufficient if the amount is less than about 0.2% by weight and because the cross-linking acrylic acid polymer may be prevented from being homogeneously and stably swelled and dispersed if the amount exceeds about 1.0% by weight.

For the purpose of preventing the ink from weeping at the tip of the pen and the writing trace from forming a smudge, the present invention further contemplates optionally incorporating an agent for imparting ropiness. An agent for imparting ropiness generally comprises an agent that increases an ink's adhesiveness and permits the ink to form a fine string-like line. Suitable agents for imparting ropiness may comprise polymers having a long chain structure. For the purpose of improving the writing sensation, the viscosity of the ink during the course of writing is generally set at a level in the range of about 300 Mpas–3000 Mpas. When the viscosity is at this level, surplus ink may escape being transferred from the tip of the pen to the surface of the paper, and as a result permeation of the paper may occur, consequently causing weeping and/or smudging. The incorporation of an optional agent for imparting ropiness results in heightening the fastness of deposited ink and reduces the presence of surplus ink. The effect of the ropiness agent may be insufficient if the amount is less than about 0.2% by weight, thus possibly impairing the writing sensation. The amount of this agent, if incorporated, is preferred to be in the range of about 0.2% by weight–about 1.5% by weight. As concrete examples of the agent for imparting ropiness, polyvinyl pyrrolidone and polyvinyl alcohol may be cited.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

EXAMPLES

Example 1

| | |
|---|---|
| Aromatic alcohol | 50.0% by weight |
| Polyhydric alcohol | 20.0% by weight |
| Deionized water | 3.0% by weight |
| Water-soluble rustproof lubricant | 1.0% by weight |
| Triethanol amine | 2.0% by weight |
| Fungusproof agent | 0.5% by weight |
| Oil-based lubricant | 3.0% by weight |
| Organic amine neutralizing agent | 3.0% by weight |
| Agent for imparting ropiness | 0.5% by weight |
| Thickener | 4.0% by weight |
| Oil-soluble dye | 12.0% by weight |
| Cross-linking acrylic acid polymer | 1.0% by weight |

A water-in-oil type dispersed ink was obtained by intimately mixing the components enumerated above excepting the cross-linking acrylic acid polymer by the use of a magnetic stirrer at 60° C. for one hour thereby forming a homogeneous microemulsion and then causing the microemulsion to swell and disperse the cross-linking acrylic acid polymer by the use of a homogenizer stirrer.

Benzyl alcohol was used as the aromatic alcohol.

Ethylene glycol was used as the polyhydric alcohol.

A phosphoric ester type surfactant (produced by Daiichi Kogyo Seiyaku Co., Ltd. and marketed under trademark designation of "PLYSURF A-208S") was used as the water-soluble rustproof lubricant.

1,2-Benzoisothiazolin-3-on (produced by Zeneka K. K. and produced under trademark designation of "PROXEL XL-2") was used as the fungusproof agent.

Oleic acid was used as the oil-based lubricant.

Polyoxyethylene alkyl amine (produced by Nippon Oils & Fats Co., Ltd. and marketed under trademark designation of "NYMINE L-201") was used as the organic amine neutralizing agent.

Polyvinyl pyrrolidone (produced by ISP Japan K. K. and marketed under product code of "PVPK-120") was used as the agent for imparting ropiness.

A ketone resin (produced by Hitachi Chemical Co., Ltd. and marketed under trademark designation of "HILAC 110H") was used as the thickener.

VALIFAST Blue-1621 (produced by Orient Chemical Co., Ltd.) was used as the oil-soluble dye.

The effect of the water-in-oil type dispersed ink as an ink for a direct-filling ball-point pen using no ink occluding substance is shown in Table 1.

Examples 2–10

Inks were obtained by following the procedure of Example 1 while using ink compositions shown in Table 1.

TABLE 1

|  | Examples | | | | | | | | | |
|---|---|---|---|---|---|---|---|---|---|---|
|  | 1 | 2 | 3 | 4 | 5 | 6 | 7 | 8 | 9 | 10 |
| Benzyl alcohol | 50.0 | 43.0 | 20.0 | 30.0 | 35.0 | 36.3 | 50.0 | 30.0 | | |
| Ethylene glycol monophenyl ether | | | | | | | | | 50.0 | 30.0 |
| Ethylene glycol | 20.0 | 20.0 | 50.0 | 25.0 | 20.0 | 20.0 | | | 20.0 | 25.0 |
| Glycerin | | | | | | | 20.0 | 25.0 | | |
| Deionized water | 3.0 | 10.0 | 3.0 | 20.0 | 20.0 | 3.0 | 3.0 | 20.0 | 3.0 | 20.0 |
| Water-soluble rustproof lubricant | 1.0 | 1.0 | 1.0 | 1.0 | 1.0 | 0.5 | 1.0 | 1.0 | 1.0 | 1.0 |
| Triethanol amine | 2.0 | 2.0 | 2.0 | 2.0 | 2.0 | 1.0 | 2.0 | 2.0 | 2.0 | 2.0 |
| Fungusproof agent | 0.5 | 0.5 | 0.5 | 0.5 | 0.5 | 0.2 | 0.5 | 0.5 | 0.5 | 0.5 |
| Oleic acid | 3.0 | 3.0 | 3.0 | 3.0 | 3.0 | 3.0 | 3.0 | 3.0 | 3.0 | 3.0 |
| Stearic acid | | | | | | | | | | |
| Water-insoluble organic amine neutralizing agent | 3.0 | 3.0 | 3.0 | 3.0 | 3.0 | 3.0 | 3.0 | 3.0 | 3.0 | 3.0 |
| Agent for imparting ropiness | 0.5 | 0.5 | 0.5 | 0.5 | 0.5 | 0.5 | 0.5 | 0.5 | 0.5 | 0.5 |
| Thickener | 4.0 | 4.0 | 4.0 | 4.0 | 4.0 | 2.0 | 4.0 | 4.0 | 4.0 | 4.0 |
| Oil-soluble dye | 12.0 | 12.0 | 12.0 | 10.0 | 10.0 | 30.0 | 12.0 | 10.0 | 12.0 | 10.0 |
| Water-soluble dye | | | | | | | | | | |
| Cross-linking acrylic acid polymer | 1.0 | 1.0 | 1.0 | 1.0 | 1.0 | 0.5 | 1.0 | 1.0 | 1.0 | 1.0 |
| Writing taste | | | ○ | | | ○ | | | | |
| Density of writing trace | | | | | | | | | | |
| Blur, weeping, or smudge in writing trace | | | ○ | ○ | ○ | ○ | | ○ | | ○ |
| Permeation of writing trace through paper to rear side | ○ | ○ | ○ | | | | ○ | ○ | | |
| Ink-retaining property | | | ○ | ○ | ○ | | | ○ | | ○ |
| Stability of ink to withstand the effect of aging | | | ○ | ○ | ○ | ○ | | ○ | | ○ |

1. The aliphatic glycol monophenyl ether was a ethylene glycol monophenyl ether.

2. The water-soluble rustproofing lubricant was a phosphoric ester type surfactant (produced by Dai-ichi Kogyo Seiyaku Co., Ltd. and marketed under trademark designation of "PLYSURF A-208S").

3. The fungusproof agent was 1,2-Benzoisothiazolin-3-on (produced by Zeneka K. K. and produced under trademark designation of "PROXEL XL-2").

4. The oil-based lubricant was oleic acid or stearic acid.

5. The organic amine neutralizing agent was polyoxyethylene alkyl amine (produced by Nippon Oils & Fats Co., Ltd. and marketed under trademark designation of "NYMINE L-201").

6. The agent for imparting ropiness was polyvinyl pyrrolidone (produced by ISP Japan K. K. and marketed under product code of "PVPK-120").

7. The thickener was a ketone resin (produced by Hitachi Chemical Co., Ltd. and marketed under trademark designation of "HILAC 110H").

8. The oil-soluble dye was VALIFAST Blue-1621 (produced by Orient Chemical Industry Co., Ltd.).

9. Writing taste examined by handwriting and rated on the four-point scale, wherein
   - ⊚ - - - Particularly favorable
   - ○ - - - Favorable
   - Δ - - - Rather inferior
   - x - - - Very inferior 10. Density of writing trace examined by handwriting and rated on the four-point scale, wherein
    - ⊚ - - - Particularly dark and clear writing trace
    - ○ - - - Dark and clear writing trace
    - Δ - - - Rather inferior
    - x - - - Very light and unclear writing trace 11. Blur, weeping, and smudge in writing trade determined by handwriting and rated on the four-point scale, wherein
    - ⊚ - - - Particularly favorable writing trace without blue, weeping, or smudge
    - ○ - - - Signs of blur, weeping, or smudge tolerable for practical purpose
    - Δ - - - Rather intolerable signs of blur, weeping, or smudge
    - x - - - Very intolerable signs of blue, weeping, or smudge 12. Permeation of writing trace through paper to rear side thereof determined by writing a letter on a writing grade paper A in the environment of 30° C. and 60% RH, allowing the paper to stand at rest in the same environment for one day, and then examining visually the rear side of the paper on the four-point scale, wherein
    - ⊚ - - - Perfect absence of exudation of ink
    - ○ - - - Practical absence of exudation of ink
    - Δ - - - Presence of slight exudation of ink
    - x - - - Evident sign of exudation of ink 13. Ink-retaining property determined by preparing a pen containing 15 g of ink, causing the pen in a capless state to drop perpendicularly from a height of 1 m with the tip of the pen held upside onto a cedar plate, then subjecting the pen to test writing, and rating the result of test on the four-point scale, wherein
    - ⊚ - - - Perfect writing obtained within 1 cm
    - ○ - - - Writing obtained within 1–3 cm
    - Δ - - - Writing obtained within 3–8 cm
    - x - - - No writing obtained within 8 cm 14. Stability of ink to withstand the effect of aging was determined by allowing an ink held in a closed glass vessel to stand at rest in the environment of 50° C. and 0% RH, examining the ink for physical properties and conditions by microscopic observation, and rating the result of test on the four-point scale, wherein
    - x - - - A sample ink producing a precipitate or showing a change of not less than 30% in physical property from initial value within one month
    - Δ - - - A sample ink producing a precipitate or showing a change of not less than 30% in physical property from initial value within 1 to 2 months
    - ○ - - - A sample ink producing a precipitate or showing a change of not less than 30% in physical property from initial value within 2 to 3 months
    - ⊚ - - - A sample ink producing no precipitate or showing a change of less than 30% in physical property from initial value over not less than 3 months

Examples 11-18

Inks were obtained by following the procedure of Example 1 while using ink compositions shown in Table 2. Example 16 represents a case of using Acid Blue 90, a water-soluble dye, as a complementary color.

TABLE 2

| | Examples | | | | | | | |
|---|---|---|---|---|---|---|---|---|
| | 11 | 12 | 13 | 14 | 15 | 16 | 17 | 18 |
| Benzyl alcohol | 30.0 | 35.0 | 35.0 | 35.0 | 36.0 | 35.0 | 42.5 | 33.0 |
| Ethylene glycol monophenyl ether | 20.0 | | | | | | | |
| Ethylene glycol | 20.0 | 30.0 | 30.0 | 24.7 | 30.0 | 30.0 | 33.0 | 30.0 |
| Glycerin | | | | | | | | |
| Deionized water | 3.0 | 10.0 | 10.0 | 10.0 | 10.0 | 10.0 | 10.0 | 10.0 |
| Water-soluble rustproof lubricant | 1.0 | 1.0 | 1.0 | 1.0 | 1.0 | 1.0 | 1.0 | 1.0 |
| Triethanol amine | 2.0 | 2.0 | 2.0 | 2.0 | 2.0 | 2.0 | 2.0 | 2.0 |
| Fungusproof agent | 0.5 | 0.5 | 0.5 | 0.5 | 0.5 | 0.5 | 0.5 | 0.5 |
| Oleic acid | 3.0 | 3.0 | | 3.0 | 3.0 | 3.0 | 2.0 | 3.0 |
| Stearic acid | | | 3.0 | | | | | |
| Water-insoluble organic amine neutralizing agent | 3.0 | 3.0 | 3.0 | 3.0 | 3.0 | 3.0 | 0.5 | 5.0 |
| Agent for imparting ropiness | 0.5 | 0.5 | 0.5 | 0.5 | 0.5 | 0.5 | 0.5 | 0.5 |
| Thickener | 4.0 | 4.0 | 4.0 | 10.0 | 2.0 | 4.0 | 4.0 | 4.0 |
| Oil-soluble dye | 12.0 | 10.0 | 10.0 | 10.0 | 10.0 | 7.0 | 3.0 | 10.0 |
| Water-soluble dye | | | | | | 3.0 | | |
| Cross-linking acrylic acid polymer | 1.0 | 1.0 | 1.0 | 0.3 | 2.0 | 1.0 | 1.0 | 1.0 |
| Writing taste | | | | | ○ | | ○ | |
| Density of writing trace | | | | | | | ○ | |
| Blur, weeping, or smudge in writing trace | | | | | ○ | ○ | | |
| Permeation of writing trace through paper to rear side | ○ | | | | ○ | | | ○ |
| Ink-retaining property | | | | | ○ | | | |
| Stability of ink to withstand the effect of aging | | | | | ○ | | | ○ |

The materials used and the method of testing adopted were the same as those of Table 1.

Comparative Examples 1–10

Inks were obtained by following the procedure of Example 1 while using the ink compositions shown in Table 3. The results are shown in Table 3.

TABLE 3

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Benzyl alcohol | 15.0 | 15.0 | 15.0 | 55.0 | 55.0 | 55.0 | 40.0 | 57.0 | 20.0 | 50.0 |
| Ethylene glycol | 50.0 | 50.0 | 40.0 | 17.0 | 20.0 | | 15.0 | 15.0 | 15.0 | 15.0 |
| Deionized water | 3.0 | 10.0 | 20.0 | 3.0 | | 20.0 | 20.0 | 3.0 | 40.0 | 3.0 |
| Water-soluble rustproof lubricant | 1.0 | 1.0 | 1.0 | 1.0 | 1.0 | 1.0 | 1.0 | 1.0 | 1.0 | 1.0 |
| Triethanol amine | 2.0 | 2.0 | 2.0 | 2.0 | 2.0 | 2.0 | 2.0 | 2.0 | 2.0 | 2.0 |
| Fungusproof agent | 0.5 | 0.5 | 0.5 | 0.5 | 0.5 | 0.5 | 0.5 | 0.5 | 0.5 | 0.5 |
| Oleic acid | 3.0 | 3.0 | 3.0 | 3.0 | 3.0 | 3.0 | 3.0 | 3.0 | 3.0 | 3.0 |
| Water-insoluble organic amine neutralizing agent | 3.0 | 3.0 | 3.0 | 3.0 | 3.0 | 3.0 | 3.0 | 3.0 | 3.0 | 3.0 |
| Agent for imparting ropiness | 0.5 | 0.5 | 0.5 | 0.5 | 0.5 | 0.5 | 0.5 | 0.5 | 0.5 | 0.5 |
| Thickener | 4.0 | 4.00 | 4.0 | 4.0 | 4.0 | 4.0 | 4.0 | 4.0 | 4.0 | 4.0 |
| Oil-soluble dye | 17.0 | 10.0 | 10.0 | 10.0 | 10.0 | 10.0 | 10.0 | 10.0 | 10.0 | 17.0 |
| Cross-linking acrylic acid polymer | 1.0 | 1.0 | 1.0 | 1.0 | 1.0 | 1.0 | 1.0 | 1.0 | 1.0 | 1.0 |
| Writing taste | x | — | — | Δ | — | — | — | — | — | — |
| Blur, weeping, or smudge in writing trace | x | — | — | x | — | — | — | — | — | — |
| Permeation of writing trace through paper to rear side | Δ | — | — | x | — | — | — | — | — | — |
| Ink-retaining property | Δ | — | — | Δ | — | — | — | — | — | — |
| Stability of ink to withstand the effect of aging | Δ | Separation | Separation | x | Separated Inferior | Separation | Separation | Separated Inferior | Separation | Separated Inferior |

The materials used and the method of testing adopted were the same as those of Table 1.

Comparative Examples 11–20

Inks were obtained by following the procedure of Example 1 while using the ink compositions shown in Table 4. The results are shown in Table 4.

Examples 8 and 10 each formed a homogeneous ink because of a small water content and yet brought about insufficient dispersion of the cross-linking acrylic acid polymer and could not set the viscosity of ink as expected because of a

TABLE 4

|  | Examples | | | | | | | | | |
|---|---|---|---|---|---|---|---|---|---|---|
|  | 11 | 12 | 13 | 14 | 15 | 16 | 17 | 18 | 19 | 20 |
| Benzyl alcohol | 50.0 | 20.0 | 30.0 |  | 40.0 | 40.0 | 33.8 | 55.5 | 37.6 | 32.5 |
| Ethylene glycol | 23.0 | 30.0 | 20.0 | 55.0 | 35.8 | 9.0 | 30.0 | 20.0 | 30.0 | 30.0 |
| Deionized water | 2.0 | 25.0 | 25.0 | 20.0 | 10.0 | 3.0 | 10.0 | 5.5 | 10.0 | 10.0 |
| Water-soluble rustproof lubricant | 1.0 | 1.0 | 1.0 | 1.0 | 1.0 | 1.0 | 1.0 | 1.0 | 1.0 | 1.0 |
| Triethanol amine | 2.0 | 2.0 | 2.0 | 2.0 | 2.0 | 2.0 | 2.0 | 2.0 | 2.0 | 2.0 |
| Fungusproof agent | 0.5 | 0.5 | 0.5 | 0.5 | 0.5 | 0.5 | 0.5 | 0.5 | 0.5 | 0.5 |
| Oleic acid | 3.0 | 3.0 | 3.0 | 3.0 | 3.0 | 3.0 | 3.0 | 3.0 | 3.0 | 3.0 |
| Water-insoluble organic amine neutralizing agent | 3.0 | 3.0 | 3.0 | 3.0 | 3.0 | 3.0 | 3.0 | 3.0 | 0.4 | 5.5 |
| Agent for imparting ropiness | 0.5 | 0.5 | 0.5 | 0.5 | 0.5 | 0.5 | 0.5 | 0.5 | 0.5 | 0.5 |
| Thickener | 4.0 | 4.0 | 4.0 | 4.0 | 2.0 | 2.0 | 6.0 | 2.0 | 4.0 | 4.0 |
| Oil-soluble dye | 10.0 | 10.0 | 10.0 | 10.0 | 2.0 | 35.0 | 10.0 | 10.0 | 10.0 | 10.0 |
| Cross-linking acrylic acid polymer | 1.0 | 1.0 | 1.0 | 1.0 | 0.2 | 1.0 | 0.2 | 2.5 | 1.0 | 1.0 |
| Writing taste | Δ | — | — | x | x | x | x | — | — | — |
| Blur, weeping, or smudge in writing trace | x | — | — | x | x | x | x | — | — | — |
| Permeation of writing trace through paper to rear side | x | — | — | Δ | X | Δ | X | — | — | — |
| Ink-retaining property | x | — | — | x | x | x | x | — | — | — |
| Stability of ink to withstand the effect of aging | Δ | Separation | Separation | Δ | Δ | x | Δ | Separation | Separated Inferior | Separated Inferior |

The materials used and the method of testing adopted were the same as those of Table 1.

Evaluation

Comparative Examples 1–3 represent cases incorporating an aromatic alcohol in an unduly small amount. Comparative Example 1, though forming a homogeneous ink because of a proportionately small water content, failed to manifest satisfactory results as to writing taste, writing trace, and ink-retaining property because of an unduly large total water-based component.

Comparative Examples 2 and 3 each incurred separation of an oil-phase portion and a water-phase portion and failed to form a homogeneous ink because of an unduly large water content.

Comparative Examples 4–6 represent cases having unduly large aromatic alcohol contents. Comparative Example 4 formed a homogeneous ink and nevertheless failed to induce thorough swelling of the cross-linking acrylic acid polymer or set the viscosity of ink as expected because of an unduly small water-based component. Thus, the sample could not preclude either inferior writing trace or permeation of the writing trace through the paper to the rear side thereof. Comparative Example 5 which omitted inclusion of water failed to swell the cross-linking acrylic acid polymer uniformly and incurred poor dispersion in spite of the increase of the polyhydric alcohol content to the fullest possible extent. Comparative Example 6 which increased the water content to the fullest possible extent for the purpose of promoting perfect dispersion of the cross-linking acrylic acid polymer failed to form a homogeneous ink and incurred separation of an oil phase and a water phase because it did not contain the polyhydric alcohol as a dispersion-stabilizing phase.

Comparative Examples 7–10 represent cases of having an unduly small polyhydric alcohol content. Comparative Examples 7 and 9 each failed to form a homogeneous ink and incurred separation of an oil phase and a water phase because of an unduly large water content. Comparative small content of the water-based component as compared with the aromatic alcohol.

Comparative Example 11 represents a case of having an unduly small water content. Though the combination formed a homogeneous ink, the produced ink could not preclude the permeation of a writing trace through a writing paper to the rear side thereof because of the small water content. The writing trace and the ink-retaining property were both inferior because the swelling of the cross-linking acrylic acid polymer did not sufficiently advance and the viscosity of ink could not be set as aimed at.

Comparative Examples 11 and 13 represent cases of incurring separation of an oil phase and a water phase and failing to form a homogeneous ink because of an unduly large water content.

Comparative Example 14 represents a case of containing no aromatic alcohol and consequently producing inferior test results in terms of writing taste, writing trace, and ink-retaining property.

Comparative Experiment 15 represents a case of having an unduly small dye content. Though the combination formed a homogeneous ink, the ink was required to be released in a large amount than usual for the purpose of retaining the density of writing trace. It was inevitably necessary, therefore, to set the viscosity of this ink at a very low level. As a result, the ink was deficient in the lubricity, an essential requirement for improving the writing taste satisfactorily. Naturally, the ink was unable to preclude the permeation of writing trace through the paper to the rear side thereof and was deficient in the ink-retaining property because of an unduly low viscosity.

Comparative Example 16 represents a case of having an unduly large dye content. The produced ink was deficient in the stability to withstand the effect of aging and was unable to have the viscosity thereof set as expected. This ink could not manifest fully satisfactory properties fit for a ball-point pen.

Comparative Example 17 represents a case of containing the cross-linking acrylic acid polymer in an unduly small amount. The viscosity of the produced ink, therefore, could not be set as expected.

Comparative Example 18 represents a case of containing the cross-linking acrylic acid polymer in an unduly large amount. In the produced ink, therefore, the cross-linking acrylic acid polymer could not be uniformly swelled and dispersed.

Comparative Example 19 represents a case of containing an organic amine neutralizing agent in a small amount and Comparative Example 20 a case of containing the neutralizing agent in a large amount. In both the produced inks of these cases, the cross-linking acrylic acid polymer could not be uniformly swelled and dispersed.

The dispersed inks according to this invention produce a light and smooth writing sensation unlike the rigid writing sensation peculiar to the ink in the conventional water-based ball-point or the heavy writing sensation peculiar to the ink in the oil-based ball-point pen. They incur substantially no permeation of a writing trace through a writing paper to the rear side thereof. Further, they are improved in the fastness of deposition of ink (resistance to shock), the fastness of a writing trace, and the stability of ink to withstand the effect of aging, i.e., the properties in which the water-based direct-filling ball-point pen is deficient. They generally manifest an outstanding effect in writing quality.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document Japanese Patent Application 8-353401 filed Nov. 28, 1996 is incorporated herein in its entirety by reference.

What is claimed is:

1. A water-in-oil dispersed ink comprising:
   (A) a water-insoluble dispersion medium comprising 20% by weight–50% by weight of a water-insoluble polar solvent of an aromatic alcohol and/or an aliphatic glycol phenyl ether, 0.5% by weight–5.0% by weight of a water-insoluble organic amine, and 3% by weight–30% by weight of an oil-soluble dye, all percentages being based on the total weight of the ink; and
   (B) a particulate dispersion phase including a dispersion stabilizing phase comprising a polyhydric alcohol that is formed on the surface of dispersed particles, said particulate dispersion phase comprising 20% by weight–50% by weight of said polyhydric alcohol, and a water-based dispersoid comprising 3% by weight 20% by weight of water, 0.3% by weight–2.0% by weight of a cross-linking acrylic acid polymer, and 0.5% by weight–4.0% by weight of triethanol amine, all percentages being based on the total weight of said ink, and wherein said dispersed particles are uniformly dispersed in said dispersion medium.

2. A water-in-oil dispersed ink according to claim 1, wherein the dispersed particles are water-soluble minute particles having diameters in the range of 100–1000 Å.

3. A water-in-oil dispersed ink according to claim 1, wherein said dispersed particles have incorporated therein a water-soluble dye as a further colorant.

4. A water-in-oil dispersed ink according to claim 3, wherein said water-soluble dye is selected from the group consisting of Direct Black 19, Direct Black 154, Direct Blue 3, Acid Blue 90, Acid Red 94, Acid Red 92, and Acid Orange 56.

5. A water-in-oil dispersed ink according to claim 1, wherein said water-insoluble dispersion comprises an oil-based lubricant and a water-insoluble thickener.

6. A water-in-oil dispersed ink according to claim 5, wherein said oil-based lubricant is selected from the group consisting of lauric acid, oleic acid, ricinolic acid, stearic acid and soybean fatty acid.

7. A water-in-oil dispersed ink according to claim 5, wherein said thickener is selected from the group consisting of ketone resin, phenol resin, amide resin, xylene resin and hydrated rosin resin.

8. A water-in-oil dispersed ink according to claim 1, wherein said particulate dispersion phase is a particulate dispersion phase having a rustproof lubricant and a fungus proof agent.

9. A water-in-oil dispersed ink according to claim 8, wherein said rustproof lubricant is selected from the group consisting of phosphoric ester surfactants, benzotriazole and fatty acid esters.

10. A water-in-oil dispersed ink according to claim 8, wherein said fungusproof agent is selcted from the group consisting of 1,2-benzoisothiazolin-3-on, soidium benzoate and sodium dehydroacetate.

11. A water-in-oil dispersed ink according to claim 1, wherein said dispersion medium incorporates therein an agent for imparting ropiness.

12. A water-in-oil dispersed ink according to claim 11, wherein said agent for imparting ropiness is selected from the group consisting of polyvinyl pyrrolidone and polyvinyl alcohol.

13. A water-in-oil dispersed ink according to claim 1, that possesses a viscosity in the range of 300–Mpas 3000 Mpas produced by writing.

14. A water-in-oil dispersed ink according to claim 1, wherein said dispersed particles comprise said cross-linking acrylic acid polymer.

15. A water-in-oil dispersed ink according to claim 1, wherein said aromatic alcohol is selected from the group consisting of benzyl alcohol, phenyl ethyl alcohol, methyl phenyl carbinol, and phthalyl alcohols, and said aliphatic glycol phenyl ether is selected from the group consisting of ethylene glycol monophenyl ether, propylene glycol phenyl ether, and propylene glycol diphenyl ether.

16. A water-in-oil dispersed ink according to claim 1, wherein said water-insoluble organic amines comprises one or more selected from the group consisting of polyoxyethylene alkyl amines, cetyl amine, and oleyl amine.

17. A water-in-oil dispersed ink according to claim 1, wherein said polyhydric alcohol comprises one or more selected from the group consisting of ethylene glycol, propylene glycol, glycerin, diethylene glycol, thiodiglycol, polyglycerin, polyethylene glycol, methyl cellosolve, butyl cellosolve, methyl carbitol, and ethyl carbitol.

* * * * *